US007173078B2

(12) United States Patent (10) Patent No.: US 7,173,078 B2
Lamprey et al. (45) Date of Patent: Feb. 6, 2007

(54) PROCESS FOR PREPARING MODIFIED PIGMENTS

(75) Inventors: Melanie G. Lamprey, Seabrook, NH (US); John Mathew, Hampton, NH (US); Paul S. Palumbo, West Newton, MA (US)

(73) Assignee: Cabot Corporation, Boston, MA (US)

( * ) Notice: Subject to any disclaimer, the term of this patent is extended or adjusted under 35 U.S.C. 154(b) by 143 days.

(21) Appl. No.: 10/121,418

(22) Filed: Apr. 12, 2002

(65) Prior Publication Data
US 2003/0195291 A1 Oct. 16, 2003

(51) Int. Cl.
C08K 9/04 (2006.01)
C08K 3/04 (2006.01)
C09C 1/44 (2006.01)
C09D 11/00 (2006.01)

(52) U.S. Cl. ............ 523/215; 524/495; 106/401; 106/472; 106/476; 106/499

(58) Field of Classification Search ........... 523/215; 524/495; 106/401, 472, 476, 499
See application file for complete search history.

(56) References Cited

U.S. PATENT DOCUMENTS

| 3,479,300 | A | 11/1969 | Rivin et al. ............... 252/430 |
| 3,573,946 | A * | 4/1971 | Wolf et al. ................ 106/413 |
| 4,014,844 | A | 3/1977 | Vidal et al. ............ 260/31.2 R |
| 4,946,509 | A | 8/1990 | Schwartz et al. ........... 106/496 |
| 5,281,261 | A | 1/1994 | Lin ....................... 106/20 R |
| 5,418,277 | A | 5/1995 | Ma et al. ................ 524/520 |
| 5,545,504 | A | 8/1996 | Keoshkerian et al. ....... 430/137 |
| 5,554,739 | A | 9/1996 | Belmont .................... 534/885 |
| 5,571,311 | A | 11/1996 | Belmont .................. 106/20 R |
| 5,630,868 | A | 5/1997 | Belmont et al. .......... 106/31.75 |
| 5,672,198 | A | 9/1997 | Belmont .................. 106/20 R |
| 5,698,016 | A | 12/1997 | Adams et al. .............. 106/316 |
| 5,707,432 | A | 1/1998 | Adams et al. ............. 106/31.6 |
| 5,713,988 | A | 2/1998 | Belmont et al. ........... 106/31.6 |
| 5,714,993 | A | 2/1998 | Keoshkerian et al. ......... 347/95 |
| 5,803,959 | A | 9/1998 | Johnson et al. .......... 106/31.75 |
| 5,837,045 | A | 11/1998 | Johnson et al. .......... 106/31.85 |
| 5,851,280 | A | 12/1998 | Belmont et al. ............ 106/472 |
| 5,885,335 | A | 3/1999 | Adams et al. .............. 106/316 |
| 5,895,522 | A | 4/1999 | Belmont et al. ........... 106/31.6 |
| 5,900,029 | A | 5/1999 | Belmont et al. .............. 8/550 |
| 5,914,806 | A | 6/1999 | Gordon, II et al. ......... 359/296 |
| 5,922,118 | A | 7/1999 | Johnson et al. ........... 106/31.6 |
| 5,952,429 | A | 9/1999 | Ikeda et al. .............. 525/326.1 |
| 5,964,935 | A | 10/1999 | Chen et al. ................ 106/401 |
| 5,968,243 | A | 10/1999 | Belmont et al. .......... 106/31.65 |
| 5,976,233 | A | 11/1999 | Osumi et al. ............. 106/31.75 |
| 6,042,643 | A | 3/2000 | Belmont et al. ............ 106/472 |
| 6,068,688 | A | 5/2000 | Whitehouse et al. ...... 106/31.65 |
| 6,103,380 | A | 8/2000 | Devonport ................ 428/403 |
| 6,110,994 | A | 8/2000 | Cooke et al. .............. 523/215 |
| 6,150,433 | A | 11/2000 | Tsang et al. ............... 523/160 |
| 6,221,143 | B1 | 4/2001 | Palumbo .................. 106/31.6 |
| 6,221,932 | B1 | 4/2001 | Moffatt et al. ............. 523/160 |
| 6,235,829 | B1 | 5/2001 | Kwan .................... 524/495 |
| 6,281,267 | B2 | 8/2001 | Parazak .................... 523/160 |
| 6,328,894 | B1 | 12/2001 | Chan et al. ................ 210/638 |
| 6,336,965 | B1 | 1/2002 | Johnson et al. ............ 106/31.6 |
| 6,350,519 | B1 | 2/2002 | Devonport ................ 428/403 |
| 6,368,239 | B1 | 4/2002 | Devonport et al. ...... 483/449.2 |
| 6,372,820 | B1 | 4/2002 | Devonport ................ 523/215 |
| 6,398,858 | B1 | 6/2002 | Yu et al. ................. 106/31.64 |
| 6,402,825 | B1 * | 6/2002 | Sun ....................... 106/473 |
| 6,432,194 | B2 | 8/2002 | Johnson et al. ............ 106/499 |
| 6,458,458 | B1 | 10/2002 | Cooke et al. .............. 428/407 |
| 6,472,471 | B2 | 10/2002 | Cooke et al. .............. 525/165 |
| 6,478,863 | B2 | 11/2002 | Johnson et al. ............ 106/31.6 |
| 6,494,943 | B1 | 12/2002 | Yu et al. ................. 106/31.65 |
| 6,494,946 | B1 | 12/2002 | Belmont et al. ............ 106/472 |
| 6,506,245 | B1 | 1/2003 | Kinney et al. ............. 106/493 |
| 6,602,335 | B2 | 8/2003 | Moffatt et al. ............. 106/31.8 |
| 6,641,653 | B2 | 11/2003 | Yu ........................ 106/31.6 |
| 6,641,656 | B2 | 11/2003 | Yu et al. .................. 106/493 |
| 6,664,312 | B2 | 12/2003 | Devonport ................ 523/205 |
| 6,699,319 | B2 | 3/2004 | Adams et al. .............. 106/476 |
| 6,723,783 | B2 * | 4/2004 | Palumbo et al. ............ 524/555 |
| 6,740,151 | B2 | 5/2004 | Belmont et al. ............ 106/31.6 |
| 2001/0003263 | A1 | 6/2001 | Johnson et al. ............ 106/413 |
| 2001/0036994 | A1 | 11/2001 | Bergemann et al. ........ 524/495 |
| 2002/0147252 | A1 | 10/2002 | Adams ..................... 523/161 |
| 2003/0195291 | A1 | 10/2003 | Lamprey et al. ............ 524/495 |
| 2003/0213410 | A1 | 11/2003 | Adams et al. ............. 106/499 |
| 2003/0217672 | A1 | 11/2003 | Palumbo .................. 106/473 |
| 2004/0007152 | A1 | 1/2004 | Palumbo .................. 106/31.6 |
| 2004/0007161 | A1 | 1/2004 | Belmont et al. ............ 106/499 |
| 2004/0103822 | A1 | 6/2004 | Champlin et al. .......... 106/473 |
| 2004/0163569 | A1 | 8/2004 | Shakhnovich ............. 106/31.8 |
| 2004/0206269 | A1 | 10/2004 | Yu ........................ 106/31.6 |
| 2004/0206275 | A1 | 10/2004 | Shakhnovich ............. 106/412 |

FOREIGN PATENT DOCUMENTS

| EP | 0 677 556 A2 | 10/1995 |
| EP | 0 688 836 A2 | 12/1995 |
| EP | 0 839 883 A2 | 5/1998 |
| GB | 2 330 842 | 5/1999 |
| JP | 6-128517 | 5/1994 |
| WO | WO00/68321 | 11/2000 |
| WO | WO01/25340 | 4/2001 |
| WO | WO01/30918 | 5/2001 |
| WO | WO02/94944 | 11/2002 |

OTHER PUBLICATIONS

International Search Report for PCT/US03/10809, mailed Nov. 10, 2003.
Written Opinion for PCT/US03/10809, mailed Jan. 21, 2005.
JP11246806 A to Toyo Ink Mfg. Co. Ltd. Publication Date Sep. 14, 1999 Abstract Only (from Patent Abstracts of Japan).
JP11080636 A to Canon Inc., Publication Date Mar. 26, 1999 Abstract Only (from Patent Abstracts of Japan).
JP11256066 A to Tokai Carbon Co. Ltd., Publication Date Sep. 21, 1999 Abstract Only (from Patent Abstracts of Japan).

* cited by examiner

Primary Examiner—Tae H Yoon

(57) ABSTRACT

A process for preparing a modified pigment having attached at least one organic group is described. This process comprises the step of reacting a dried mixture comprising a pigment having attached at least one reactive group and a modifying agent. The dried mixture is reacted under high intensity mixing conditions for a time and temperature sufficient to form the modified pigment.

32 Claims, No Drawings

US 7,173,078 B2

PROCESS FOR PREPARING MODIFIED PIGMENTS

BACKGROUND OF THE INVENTION

1. Field of the Invention

The present invention relates to a process for preparing a modified pigment having attached at least one organic group.

2. Description of the Related Art

The surface of pigments contain a variety of different functional groups, and the types of groups present depend on the specific class of pigment. Several methods have been developed for grafting materials and, in particular, polymers to the surface of these pigments. For example, it has been shown that polymers can be attached to carbon blacks containing surface groups such as phenols and carboxyl groups. However, methods which rely on the inherent functionality of a pigment's surface cannot be applied generally because not all pigments have the same specific functional groups.

Methods for the preparation of modified pigment products have also been developed which can provide a pigment with a variety of different attached functional groups. For example, U.S. Pat. No. 5,851,280 discloses methods for the attachment of organic groups onto pigments including, for example, attachment via a diazonium reaction wherein the organic group is part of the diazonium salt. The resulting surface-modified pigments can be used in a variety of applications, such as inks, inkjet inks, coatings, toners, plastics, rubbers, and the like.

Other methods to prepare modified pigments have also been described. For example, PCT Publication No. WO 01/51566 discloses methods of making a modified pigment by reacting a first chemical group and a second chemical group to form a pigment having attached a third chemical group. Ink compositions containing these pigments are also described.

While these methods provide modified pigments having attached groups, there remains a need for improved processes for attaching groups and, in particular, polymeric groups, to a pigment. These additional methods may provide advantageous alternatives to forming modified pigments.

SUMMARY OF THE INVENTION

The present invention relates to a process for preparing a modified pigment having attached at least one organic group comprising the step of reacting a dried mixture comprising a pigment having attached at least one reactive group and a modifying agent under high intensity mixing conditions for a time and temperature sufficient to form the modified pigment. The dried mixture may be prepared by combining, in any order, either a dispersion or a dried form of the pigment having attached at least one reactive group with the modifying agent, either in liquid or solid form.

DETAILED DESCRIPTION OF THE INVENTION

The present invention relates to a process for preparing a modified pigment having attached at least one organic group.

The process of the present invention comprises the step of reacting a dried mixture of a pigment having attached at least one reactive group and a modifying agent under high intensity mixing conditions for a time and temperature sufficient to form the modified pigment. As used herein, the term "dried" does not mean substantially free of volatile material. Thus, the dried mixture may contain a high level of volatile material, such as about 50% or more of a volatile solvent or vehicle. Rather, the term "dried" refers to the physical state of the material. The dried mixture in the process of the present invention is a material that is capable of being processed in high intensity mixing equipment, such as is further described below. As such, the dried mixture is a material which has a viscosity that is high enough to be processed in high intensity mixers. Thus, the dried mixture may be a material having the consistency of, for example, a paste or putty. Preferably, the dried mixture has a viscosity of greater than about 10,000 centipoise, more preferably 100,000 centipoise, and most preferably 500,000 centipoise. Examples of materials having these viscosity are described in Perry's Chemical Engineer's Handbook ($7^{th}$ Edition), Chapter 18, pages 18-25 to 18-32, which is incorporated in its entirety herein by reference. The dried mixture may also be in a solid or semi-solid form and may be, for example, a free flowing or tacky powder. In this case, it is preferred that, when the solid or semi-solid material is processed under the high intensity mixing conditions described below, a material having a measurable viscosity results. The dried mixture may also contain additives such as high boiling cosolvents, surfactants, dispersants, processing aids, waxes, and the like.

The dried mixture may be prepared using any technique known to one skilled in the art. In one embodiment, the dried mixture is prepared by combining, in any order, a dispersion of a pigment having attached at least one reactive group and the modifying agent. The dispersion of the pigment may be either an aqueous or non-aqueous dispersion and is preferably an aqueous dispersion. The modifying agent may be in either a solid form or a liquid form. Liquid forms include both non-viscous and viscous liquids, such a syrups and oils. The modifying agent may also dissolve in the dispersion of the pigment. The modifying agent may also be combined with the dispersion of the pigment as a solution in a solvent. In this case, it is preferred that the solvent be one which is at least partially soluble in the pigment dispersion.

The combination of pigment dispersion and modifying agent results in the formation of a wet mixture. This wet mixture has a liquid-like consistency and may, for example, be a dispersion comprising both the pigment having at least one reactive group and the modifying agent. The resulting wet mixture is then dried to form the desired dried mixture. Any method of drying known to one skilled in the art may be used including, for example, oven drying, spray drying, and flash evaporation. In addition, the drying may occur in the same equipment in which the pigment having attached at least one reactive group and the modifying agent are reacted, such as a dewatering or coagulating extruder. Regardless of the method of drying, it is not necessary to remove all of the liquid from the wet mixture, as long as the resulting dried mixture has the characteristics described above.

In a second embodiment, the dried mixture is prepared by combining, in any order, a dry form of the pigment having attached at least one reactive group and the modifying agent. The dry form of the pigment can be prepared by a variety of methods, including, for example, drying of either an aqueous or non-aqueous dispersion of the pigment. The modifying agent may be in either a solid form or a liquid form, such as a solution in a solvent. The combination of the dry form of the pigment having attached at least one reactive group and the modifying agent results in the formation of a mixture which can optionally be dried. For example, when a solution of the modifying agent is used, the resulting mixture is preferably dried. When a solid form of the modifying agent is used in combination with a dry form of the pigment, no further drying is needed. Methods of drying include those described above.

As stated previously, the present invention relates to a process for preparing a modified pigment having attached at least one organic group. This process comprises the step of reacting a dried mixture of a pigment having attached at least one reactive group and a modifying agent. The pigment can be any type of pigment conventionally used by those skilled in the art, such as black pigments and other colored pigments. Preferably, when the pigment is a black pigment, the pigment is carbon black. Mixtures of different pigments can also be used. These pigments can also be used in combination with a variety of different types of dispersants in order to form stable dispersions and inks.

Representative examples of black pigments include various carbon blacks (Pigment Black 7) such as channel blacks, furnace blacks and lamp blacks, and include, for example, carbon blacks sold under the Regal®, Black Pearls®, Elftex®, Monarch®, Mogul®, and Vulcan® trademarks available from Cabot Corporation (such as Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® L, Elftex® 8, Monarch® 1400, Monarch® 1300, Monarch® 1100, Monarch® 1000, Monarch® 900, Monarch® 880, Monarch® 800, Monarch® 700, Mogul® L, Regal® 330, Regal® 400, Vulcan® P).

The pigment may also be chosen from a wide range of conventional colored pigments. The colored pigment can be blue, black, brown, cyan, green, white, violet, magenta, red, orange, yellow, as well as mixtures thereof. Suitable classes of colored pigments include, for example, anthraquinones, phthalocyanine blues, phthalocyanine greens, diazos, monoazos, pyranthrones, perylenes, heterocyclic yellows, quinacridones, and (thio)indigoids. Such pigments are commercially available in either powder or press cake form from a number of sources including, BASF Corporation, Engelhard Corporation and Sun Chemical Corporation. Examples of other suitable colored pigments are described in the Colour Index, 3rd edition (The Society of Dyers and Colourists, 1982).

The pigment can have a wide range of BET surface areas, as measured by nitrogen adsorption, depending on the desired properties of the pigment. As known to those skilled in the art, a higher the surface area will correspond to smaller particle size. If a higher surface area is not readily available for the desired application, it is also well recognized by those skilled in the art that the pigment may be subject to conventional size reduction or comminution techniques, such as ball or jet milling, to reduce the pigment to a smaller particle size, if desired.

The reactive group of the pigment used in the method of the present invention is any group capable of reacting with the modifying agent. This reactive group can comprise either a nucleophilic group or an electrophilic group, depending on the nature of the modifying agent, which is further described below. Thus, for example, the nucleophilic or electrophilic group may be a carboxylic acid or ester, an acid chloride, a sulfonyl chloride, an acyl azide, an isocyanate, a ketone, an aldehyde, an anhydride, an amide, an imide, an imine, an α,β-unsaturated ketone, aldehyde, or sulfone, an alkyl halide, an epoxide, an alkyl sulfonate or sulfate such as a (2-sulfatoethyl)-sulfone group, an amine, a hydrazine, an alcohol, a thiol, a hydrazide, an oxime, a triazene, a carbanion, an aromatic compound, or salts and derivatives thereof.

The reactive group may comprise at least one ionic group, ionizable group, or mixtures of an ionic group and an ionizable group. An ionic group is either anionic or cationic and is associated with a counterion of the opposite charge including inorganic or organic counterions such as $Na^+$, $K^+$, $Li^+$, $NH_4^+$, $NR'_4^+$, acetate, $NO_3^-$, $SO_4^{-2}$, $R'SO_3^-$, $R'OSO_3^-$, $OH^-$, and $Cl^-$, where R' represents hydrogen or an organic group such as a substituted or unsubstituted aryl and/or alkyl group. An ionizable group is one that is capable of forming an ionic group in the medium of use. Organic ionic groups include those described in U.S. Pat. No. 5,698,016, the description of which is fully incorporated herein by reference.

The reactive group may comprise at least one anionic or anionizable group. Anionic groups are negatively charged ionic groups that may be generated from groups having ionizable substituents that can form anions (anionizable groups), such as acidic substituents. They may also be the anion in the salts of ionizable substituents.

Representative examples of anionic groups include $—COO^-$, $—SO_3^-$, $—OSO_3^-$, $—HPO_3^-$; $—OPO_3^{-2}$, and $—PO_3^{-2}$. Representative examples of anionizable groups include $—COOH$, $—SO_3H$, $—PO_3H_2$, $—R'SH$, $—R'OH$, and $—SO_2NHCOR'$, where R' represents hydrogen or an organic group such as a substituted or unsubstituted aryl and/or alkyl group. Preferably, the anionic or anionizable group is a carboxylic acid group, an alkylsulfate group, or salts thereof.

The reactive group may comprise at least one cationic or cationizable group. Cationic groups are positively charged organic ionic groups that may be generated from ionizable substituents that can form cations (cationizable groups), such as protonated amines. For example, alkyl or aryl amines may be protonated in acidic media to form ammonium groups $—NR'_2H^+$, where R' represent an organic group such as a substituted or unsubstituted aryl and/or alkyl group. Preferably, the cationic or cationizable group is an amine group or salt thereof and more preferably is a benzylamine, phenyethylamine, phenyleneamine, or aminoalkylamine group such as an $—SO_2-ALK1-NH-ALK2-NH_2$ group, wherein ALK1 and ALK2, which can be the same or different, are C2–C8 alkylene groups.

The reactive group may also be a polymeric group. This polymeric reactive group can be any type of polymeric group such as, for example, a thermoplastic polymeric group or a thermosetting polymeric group. Further, the polymeric group can be a homopolymer, copolymer, terpolymer, and/or a polymer containing any number of different repeating units. Further, the polymeric group can be a random polymer, alternating polymer, graft polymer, block polymer, hyperbranched or dendritic polymer, and/or comb-like polymer.

Polymeric reactive groups may comprise multiple nucleophilic and/or electrophilic groups and therefore may be capable of multiple reactions with the modifying agents. Examples of general classes of polymeric reactive groups include, but are not limited to, polyamines, polyamides, polycarbonates, polyelectrolytes, polyesters, polyethers (such as polyalkyleneoxides), polyols (such as polyhydroxybenzene and polyvinyl alcohol), polyimides, polymers containing sulfur (such as polyphenylene sulfide), acrylic polymers, polyolefins including those containing halogens (such as polyvinyl chloride and polyvinylidene chloride), fluoropolymers, and polyurethanes. Preferred polymeric groups include polyamine groups, polyalkylene oxide groups, polyol groups, polyacid groups, or salts or derivatives thereof.

The polymeric group preferably comprises ionic or ionizable groups as described above. Thus, one preferred reactive group is a polymeric group comprising one or more anionic or anionizable groups. Preferred anionic or anionizable polymeric groups are polyacid groups or salts thereof, including, for example, acrylic or methacrylic acid polymeric groups, including polyacrylic or polymethacrylic acid groups and poly(styrene-acrylic acid) or poly(styrene-methacrylic acid) groups, and hydrolyzed derivatives of maleic anhydride-containing polymeric groups such as styrene-maleic acid groups.

Another preferred reactive group is a polymeric group comprising one or more cationic or cationizable groups, such as amine groups or salt thereof. Preferred cationic or cationizable polymeric groups include linear or branched polyamine groups such as polyethyleneimine (PEI) group and derivatives thereof, oligomeric groups of ethyleneimine (such as pentaethylenehexamine, PEHA) and derivatives thereof, and polyamidoamine (PAMAM) groups (such as Starburst® polyamidoamine dendrimers).

The reactive group may also be a polymeric group comprising one or more non-ionic groups. Examples include alkylene oxide groups of from about 1 to about 12 carbons and polyols. Examples of preferred alkylene oxide groups include, but are not limited to, $-CH_2-CH_2-O-$; $-CH(CH_3)-CH_2-O-$; $-CH_2-CH(CH_3)-O-$, $-CH_2CH_2CH_2-O-$, or combinations thereof. Preferably these non-ionic groups further comprise at least one nucleophilic or electrophilic group, such as an $-OH$ group.

The reactive group may be a polymeric group represented by the formula $-X-Sp-[Polymer]R$. X, which is directly attached to the pigment, represents an arylene or heteroarylene group or an alkylene group and is substituted with an Sp group. Sp represents a spacer group. The group Polymer represents a polymeric group. R represents hydrogen, a bond, a substituted or unsubstituted alkyl group, or a substituted or unsubstituted aryl group.

The group Polymer represents a polymeric group comprising repeating monomer groups or multiple monomer groups or both. Preferably, at least one type of monomer group comprises at least one ionic or ionizable group. The group Polymer can be any of the types of polymeric groups described above, and may further be substituted with additional groups. The total number of monomer repeating units that comprise the group Polymer is preferably not greater than about 500 monomer repeating units.

The group Sp represents a spacer group which, as used herein, is a link between two groups. The group Sp can be a bond or a chemical group. Examples of chemical groups include, but are not limited to, $-CO_2-$, $-O_2C-$, $-CO-$, $-OSO-$, $-SO_3$, $SO_2-$, $-SO_2C_2H_4O-$, $-SO_2C_2H_4\ S-$, $-SO_2C_2H_4NR-$, $-O-$, $-S-$, $-NR-$, $-NRCO-$, $-CONR-$, $-NRCO_2-$, $-O_2CNR-$, $-NRCONR-$, $-NRCOCH(CH_2CO_2R)-$, $-NRCOCH_2CH(CO_2R)-$, $-N(COR)(CO)-$, imide groups, arylene groups, alkylene groups and the like. R, which can be the same or different, represents hydrogen or an organic group such as a substituted or unsubstituted aryl or alkyl group.

The group X represents an arylene or heteroarylene group or an alkylene group. X is directly attached to the pigment and is further substituted with an Sp group. The aromatic group can be further substituted with any group, such as one or more alkyl groups or aryl groups. Preferably, the arylene group is phenylene, naphthylene, or biphenylene, and the heteroarylene group. When X represents an alkylene group, examples include, but are not limited to, substituted or unsubstituted alkylene groups which may be branched or unbranched. The alkylene group can be substituted with one or more groups, such as aromatic groups. Examples include, but are not limited to, $C_1-C_{12}$ groups like methylene, ethylene, propylene, or butylene, groups. Preferably, X is an arylene group.

The group X may be substituted with one or more functional groups. Examples of functional groups include, but are not limited to, R", OR", COR", COOR", OCOR", carboxylates, halogens, CN, NR"$_2$, SO$_3$H, sulfonates, sulfates, NR"(COR"), CONR"$_2$, NO$_2$, PO$_3$H$_2$, phosphonates, phosphates, N=NR", SOR", NSO$_2$R", wherein R" which can be the same or different, is independently hydrogen, branched or unbranched $C_1-C_{20}$ substituted or unsubstituted, saturated or unsaturated hydrocarbons, e.g., alkyl, alkenyl, alkynyl, substituted or unsubstituted aryl, substituted or unsubstituted heteroaryl, substituted or unsubstituted alkaryl, or substituted or unsubstituted aralkyl.

As shown by the structure above, the group Polymer is attached to the pigment through the spacer group Sp. However, it will also be recognized that when R represents a bond, the available bond can also be attached to the pigment. In addition, the group Polymer can also be attached to the pigment at multiple points along the polymer chain through proper choice of substituent groups on the repeating monomer units. These substituents may also comprise spacer groups or $-X-Sp-$ groups as described above. Thus, these groups can be attached to the pigment at either end or at points along the backbone. Further, these groups can be any type of polymeric group, such as a random polymer, alternating polymer, graft polymer, block polymer, star-like polymer, and/or comb-like polymer.

The pigment having attached at least one reactive group used in the method of the present invention can be prepared using methods known to those skilled in the art. For example, these pigments can be prepared using the methods described in U.S. Pat. Nos. 5,851,280, 5,698,016, 5,922,118, and 5,837,045, and PCT Publication Nos. WO 99/51690 and WO 00/22051, the descriptions of which are fully incorporated herein by reference. These methods provide for a more stable attachment of the groups onto the pigment compared to traditional adsorbed groups, such as polymers, surfactants, and the like.

The pigment having attached at least one reactive group may also be prepared using the method described in PCT Publication No. WO 01/51566, which is incorporated in its entirety herein by reference. Thus, for example, the reactive group may comprise the reaction product of at least one electrophile, such as a (2-sulfatoethyl)-sulphone group or a benozoic acid group, and at least one nucleophilic polymer, such as a polyamine. Other examples are also disclosed in the above-cited reference.

The amount of the reactive groups can be varied. Preferably, the total amount of reactive groups is from about 0.01 to about 10.0 micromoles of organic group/m$^2$ surface area of pigment, as measured by nitrogen adsorption (BET method). For example, the amount of reactive groups is between from about 0.5 to about 4.0 micromoles/m$^2$. Additional attached organic groups which are not reactive with the modifying agent may also be used.

The pigment having attached at least one reactive group may be purified by washing, such as by filtration, centrifugation, or a combination of the two methods, to remove unreacted raw materials, byproduct salts and other reaction impurities. The pigments may also be isolated, for example, by evaporation or it may be recovered by filtration and drying using known techniques to those skilled in the art.

As stated previously, the present invention relates to a process for preparing a modified pigment having attached at least one organic group comprising the step of reacting a dried mixture of a pigment having attached at least one reactive group and a modifying agent. The reactive group and the modifying agent will react to form the organic group of the modified pigment. Preferably, the modifying agent comprises at least one functional group which is capable of reacting with the reactive group of the pigment. Thus, the organic group of the modified pigment of the present invention comprises the reaction product of the reactive group and the functional group of the modifying agent. The reactive group and the functional group may react covalently or ionically, and preferably react covalently.

The functional group of the modifying agent can be either a nucleophilic group or an electrophilic group, depending on the nature of the reactive group of the pigment, which is described above. Thus, for example, if the reactive group of the pigment comprises at least one electrophilic group, a modifying agent should be chosen comprising at least one nucleophilic group, and vice-versa. Preferably, the functional group of the modifying agent comprises a group such as a carboxylic acid or ester, an acid chloride, a sulfonyl chloride, an acyl azide, an isocyanate, a ketone, an aldehyde, an anhydride, an amide, an imide, an imine, an $\alpha,\beta$-unsaturated ketone, aldehyde, or sulfone, an alkyl halide, an epoxide, an alkyl sulfonate or sulfate such as a (2-sulfatoethyl)-sulfone group, an amine, a hydrazine, an alcohol, a thiol, a hydrazide, an oxime, a triazene, a carbanion, an aromatic compound, or salts or derivatives thereof. Most preferred is a functional group comprising a carboxylic acid group, an amine group, or a salt thereof.

The modifying agent may be a polymeric material such as a homopolymer, copolymer, terpolymer, and/or a polymer containing any number of different repeating units, including a random polymer, alternating polymer, graft polymer, block polymer, hyperbranched or dendritic polymer, and/or comb-like polymer. When the modifying agent is a polymer, the polymer comprises at least one functional group as described above. The functional group may be present either along the polymer backbone—i.e., the monomeric units of the polymer may comprise the functional group—or as a terminating group of the polymer. Preferably the polymeric modifying agent is a polyamine, a polyalkylene oxide, a polyol, a polyacid, a polyacrylate, or salts or derivatives thereof and most preferably is a polyamine or a polyacid. Examples of polyamines include, but are not limited to, linear or branched polyamines such as polyethylenemine (PEI) or derivatives thereof, oligomers of ethyleneimine (such as pentaethylenehexamine, PEHA) or derivatives thereof, and polyamidoamines (PAMAM), such as Starburst® polyamidoamine dendrimers. Examples of polyacids include, but are not limited to acrylic or methacrylic acid homo- and copolymers, including polyacrylic or polymethacrylic acid and poly(styrene-acrylic acid) or poly(styrene-methacrylic acid), and hydrolyzed derivatives of maleic anhydride-containing polymers such as styrene-maleic acid polymers.

The process of the present invention comprises the step of reacting the dried mixture of pigment having attached at least one reactive group and a modifying agent under high intensity mixing conditions. Such conditions are known to one skilled in the art and can be achieved using a variety of high intensity mixers and similar equipment that are designed to mix, blend, stir, homogenize, disperse, and/or compound materials. Any mixer used for processing high viscosity materials can be used in the process of the present invention, not just those described traditionally as high intensity mixers. These are described in Perry's Chemical Engineer's Handbook (7$^{th}$ Edition), Chapter 18, pages 18-25 to 18-32, which is incorporated in its entirety herein by reference. The high intensity mixer can be batch, semi-continuous, or continuous mixer. A continuous mixer which offers both economic and practical advantages to batch processing equipment and is generally preferred. Examples of high intensity mixers include, but are not limited to, single or double planetary mixers, dual shaft planetary mixers (particularly those in which one shaft has a saw tooth blade), helical mixers such as double helical mixers or twin blade conical mixers, double arm kneading mixers such as a Brabender or Farrel mixer, high intensity mixers such a Henschel or papenmeir mixers, two or three roll mixers, and single or double (twin) screw extruders.

The process of the present invention is run for a time and at a temperature sufficient to produce a modified pigment having attached at least one organic group. Both the reaction time and temperature will depend on several factors, including the type of reactive group on the pigment, the type of modifying agent, and the amounts of each reagent. Also, when the modifying agent is a polymer, the type and molecular weight of the polymer will effect the reaction time and temperature. In general, the reaction takes place over a time between about 0.1 minutes and about 300 minutes, preferably between about 1 minute and about 120 minutes, and more preferably between about 5 minutes and about 60 minutes. The reaction temperature is generally between about 25° C. and about 250° C. and is preferably between about 100° C. and about 200° C. The high intensity mixing conditions may also include low pressure conditions resulting from the use of a vacuum. The resulting modified pigment may be further purified using techniques such as those described above.

The modified pigments having attached at least one organic group can be used in a variety of applications. For example, the modified pigments can be dispersed in a vehicle and used in an ink or coating application. The vehicle can be either an aqueous or non-aqueous vehicle, depending on the nature of the attached organic group. In particular, the modified pigments can be used in inkjet ink compositions and are believed to be effective in inkjet ink applications.

While not wishing to be bound by theory, it is believed that, by preparing a dried mixture of the pigment having attached at least one reactive group and the modifying agent, and reacting this dried mixture under high intensity mixing conditions, a more complete reaction occurs between the reactive group and the modifying agent. This improved reaction efficiency enables the use of lower amounts of modifying agent. Thus, less reagents are needed to produce a modified pigment having desired performance properties. The modified pigments will therefore generally require less post-processing, such as purification. Both the reduced input and purification provides significant cost savings for producing these modified pigments. In addition, the resulting modified pigments have been found to require less energy and time to form a dispersion while the particle size of the modified pigment in the dispersion is also generally smaller.

The present invention will be further clarified by the following examples which are intended to be only exemplary in nature.

EXAMPLES

For the following examples, a Brabender Plasticorder mixer (7.5 hp, type 6 mixer bowl, available from C. W. Brabender Co.) with interchangeable electrically heated mixer bowls of 60 or 300 cc volume equipped with roller blades, was used. The chamber was filled to 85% capacity for each run.

Polymers A, B and C are random copolymers of styrene and acrylic acid which may be synthesized by known methods or commercially obtained from suppliers such as S C Johnson Polymer. Polymer A, B and C have the following properties: Polymer A has an acid number (mg of KOH per gram of dried polymer required to neutralize all acid groups) of 215 and average MW of 4500; Polymer B has an acid number 165 and average MW 8000; Polymer C has an acid number 154 and average MW 7000.

High intensity mixing of dispersions was performed using a high intensity mixer such as a Silverson model L4RT-A or a Heidolph Diax 900. Diafiltration was performed on a dispersion of 10% solids or below using a 0.05 micron pore size hollow fiber membrane as available from Spectrum Labs, AG Technologies or like suppliers. Sonication was carried out using a Misonix Ultrasonic Processor with a model CL4 probe.

Particle size was determined using a Microtrac® Particle Size Analyzer, and the values reported are the mean volume particle size (mV). Percent attached polymer is calculated from thermogravimentric analysis (TGA) using a TA Instruments TGA Model 2950. The samples were analyzed under nitrogen according to the following temperature profile: 10° C./min up to 110° C., hold at 110° C. for 10 minutes, continue heating at 10° C./min up to 800° C., and hold at 800° C. for 10 minutes. Percent attached material is determined from comparison of the weight lost between 110° C. and 800° C. of the final product compared to that of the starting materials.

Example 1

A dispersion of Black Pearls® 880 carbon black (available from Cabot Corporation, Boston Mass.) having attached amine groups (13.3% solids, prepared according to the procedure described in PCT Publication No. WO01/51566), was dried in a 70° C. oven overnight. The resulting solid was manually ground to form a dry powder. 10.7 g of this powder was mixed in a container with 53.4 g dry polymer A to form a dried mixture.

A Brabender high intensity mixer with a 60 cc chamber was preheated to 140° C., and the dried mixture was added to the chamber slowly with mixing at 60 rpm mixing speed. Mixing was continued for 30 minutes to produce a modified carbon black pigment. The resultant modified pigment was removed from the mixing chamber, cooled to room temperature, and collected.

The modified pigment was purified by grinding the material with a mortar and pestle to form a powder and dispersing the powder in 406 g of 0.5M NaOH solution (0.203 moles). High intensity mixing using a Heidolph Diax 900 mixer at 12000 rpm and sonication using a Misonix ultrasonic probe at power 7 was used to produce a dispersion of the modified pigment. Diafiltration with 0.1M NaOH was run until polymer levels in the permeate reached less than 50 ppm as measured by UV absorbance at 250 nm. This was followed by diafiltration with deionized water until the pH of the permeate reached 7–8. Finally, the percent solids were adjusted to approximately 10–20% by concentration of the retentate, to yield the final dispersion of modified pigment, which was analyzed for particle size and percent polymer. Results are shown in Table 2 below.

Examples 2–6

For these examples, a modified pigment was prepared using a process similar to that described in Example 1, with changes as noted in Table 1 below. A dispersion of each of these modified pigments was also prepared and purified as described in Example 1. The properties of the dispersions are shown in Table 2 below.

Example 7

A modified pigment was prepared using a process similar to that described in Example 1, with changes as noted in Table 1 below. A dispersion of this modified pigment was also prepared as described in Example 1 and purified similarly, with the exception that, before diafiltration, the dispersion of the modified pigment was centrifuged at 5% solids using a Beckmann centrifuge at 5000 rpm for 15 minutes and the sample decanted from the centrifuge bottle. The dispersion was then diafiltered as described in Example 1. The properties of the dispersion are shown in Table 2 below.

Comparative Example 1

A dispersion of Black Pearls® 880 carbon black having attached amine groups (982.3 g of a 13% solids dispersion) was mixed with a solution of polymer A (617 g) dissolved in 2500 g water containing 295 g of 28% ammonium hydroxide. The mixture was poured into glass trays and placed in a vented oven at 150° C. for a period of 18 hours, during which time the water evaporated and a modified carbon black was produced. The resulting modified pigment was then cooled to room temperature and powdered in a blender to a fine powder.

The modified pigment powder was purified by first dispersing the material in 4720 g of 0.5M NaOH (2.36 moles NaOH) with overhead stirring for 2 hours to 45° C. Next, the sample was sonicated using a sonic probe for 60 minutes. Finally, diafiltration with 0.1 M NaOH was performed until polymer levels in the permeate reached less than 50 ppm as measured by UV absorbance at 250 nm. This was followed by diafiltration with deionized water until the pH of the permeate reached 7–8. The percent solids were adjusted to approximately 10% by concentration of the retentate, to yield the final dispersion, which was analyzed for particle size and percent polymer. Results are shown in Table 2 below.

Comparative Example 2

A modified pigment was prepared following the procedure of Comparative Example 1, with changes as noted in Table 1. A dispersion of this modified pigment was also prepared as describe in Comparative Example 1. The properties of the dispersion are shown in Table 2 below.

TABLE 1

| Example No. | 1 | 2 | 3 | 4 | 5 | 6 | 7 | Comp 1 | Comp 2 |
|---|---|---|---|---|---|---|---|---|---|
| Attached amine group | AG1 | AG1 | AG1 | AG1 | AG1 | AG2 | AG1 | AG1 | AG1 |
| Polymer | A | A | B | A | C | A | C | A | A |
| Weight Ratio (Polymer/Carbon Black) | 5 | 5 | 5 | 2 | 5 | 5 | 2 | 5 | 2 |
| Weight dry CB (g) | 10.7 | 10.7 | 10.7 | 22.1 | 53.3 | 10.7 | 22.1 | 127.7 | 40 |
| Weight polymer (g) | 53.4 | 53.4 | 53.4 | 45.0 | 260.3 | 53.4 | 45.0 | 617 | 80 |
| Chamber size (cc) | 60 | 60 | 60 | 60 | 300 | 60 | 60 | N/A | N/A |
| Reaction time (hours) | 0.5 | 0.5 | 0.5 | 0.5 | 0.75 | 0.5 | 0.75 | 18 | 18 |
| Reaction temp (° C.) | 140 | 180 | 140 | 140 | 160 | 140 | 140 | 150 | 150 |
| Dispersion step 1 | HS | HS | HS | HS | HS | HS | HS | LS | LS |
| Dispersion time 1 (hrs) | 0.5 | 0.5 | 0.5 | 0.5 | 0.5 | 0.5 | 0.5 | 2 | 2 |
| Dispersion Step 2 | SX | SX | N/A | N/A | SX | N/A | SX | SX | SX |
| Dispersion time 2 (hrs) | 0.33 | 0.33 | N/A | N/A | 0.5 | N/A | 0.33 | 1 | 1 |

Dispersion Steps 1 and 2:
HS = High shear mixing, SX = sonication, LS = overhead stirring with heating to 45° C.
Attached amine group:
AG1 = PEHA, AG2 = ethylene diamine

TABLE 2

| Example No. | Particle Size (mV) | % Attached Polymer |
|---|---|---|
| 1 | 0.0948 | 13 |
| 2 | 0.1222 | 14 |
| 3 | 0.1078 | 10 |
| 4 | 0.0964 | 11 |
| 5 | 0.1165 | 14 |
| 6 | 0.0988 | 12 |
| 7 | 0.1109 | 17 |
| Comp 1 | 0.1402 | 13 |
| Comp 2 | 0.1533 | 13 |

The above examples show that the process of the present invention produced dispersions of modified pigments having a smaller particle size than those of the Comparative Examples. Furthermore, a similar attachment level was achieved while using less polymer (a lower polymer/carbon black ratio), thereby reducing the initial raw material costs and purification time. In addition, less time was required for the reaction to occur, and the reaction was easier to process and therefore easier to scale. Finally the modified pigments produced by the process of the present invention required less energy to disperse, resulting in dispersions with the same or smaller particle size. Other combinations of modifying agents and process conditions may lead to further improvements.

As a result, it is believed that the resulting modified pigments can be used to prepare an inkjet ink composition having improved optical density and greater ink stability compared to an inkjet ink composition comprising the modified pigments of the comparative examples. Furthermore, variations to the formulation which would further improve print performance (such as smearfastness and durability) will be known to one skilled in the art.

What is claimed is:

1. A process for preparing a modified pigment having attached at least one organic group comprising the step of reacting a dried mixture comprising a pigment having attached at least one reactive group and a modifying agent under high intensity mixing conditions for a time and temperature sufficient to form the modified pigment, wherein the dried mixture is prepared by: i) combining, in any order, a dispersion comprising the pigment having attached at least one reactive group and the modifying agent to produce a wet mixture, and ii) drying the wet mixture.

2. The process of claim 1, wherein the dispersion is an aqueous dispersion.

3. The process of claim 1, wherein the dispersion is a non-aqueous dispersion.

4. The process of claim 1, wherein the modifying agent is in a liquid form.

5. The process of claim 1, wherein the modifying agent is in a solid form.

6. A process for preparing a modified pigment having attached at least one organic group comprising the step of reacting a dried mixture comprising a pigment having attached at least one reactive group and a modifying agent under high intensity mixing conditions for a time and temperature sufficient to form the modified pigment, wherein the dried mixture is prepared by: i) combining, in any order, a dry form of the pigment having attached at least one reactive group and a liquid form of the modifying agent to form a wet mixture, and ii) drying the wet mixture.

7. A process for preparing a modified pigment having attached at least one organic group comprising the step of reacting dried mixture comprising a pigment having attached at least one reactive group and a modifying agent under high intensity mixing conditions for a time and temperature sufficient to form the modified pigment, wherein the dried mixture is prepared by combining, in any order, a dry form of the pigment having attached at least one reactive group and a solid form of the modifying agent.

8. The process of claim 7, wherein the dried mixture is a powder.

9. The process of claim 7, wherein the pigment comprises a blue pigment, a black pigment, a brown pigment, a cyan pigment, a green pigment, a white pigment, a violet pigment, a magenta pigment, a red pigment, an orange pigment, a yellow pigment, or mixtures thereof.

10. The process of claim 7, wherein the pigment is carbon black.

11. The process of claim 7, wherein the reactive group comprises a electrophilic group.

12. The process of claim 7, wherein the reactive group comprises an electrophilic group.

13. The process of claim 7, wherein the reactive group comprises at least one carboxylic acid or ester, acid chloride, sulfonyl chloride, acyl azide, isocyanate, ketone, aldehyde, anhydride, amide, imide, imine, α,β-unsaturated ketone, aldehyde, or sulfone, alkyl halide, epoxide, alkyl sulfonate or sulfate, amine, hydrazine, alcohol, thiol, hydrazide, oxime, triazene, carbanion, aromatic compound, or salts thereof.

14. A process for preparing a modified pigment having attached at least one organic group comprising the step of reacting a dried mixture comprising a pigment having attached at least one reactive group and a modifying agent under high intensity mixing conditions for a time and temperature sufficient to form the modified pigment, wherein the reactive group comprises at least one ionic group, ionizable group, or mixtures thereof.

15. The process of claim 7, wherein the reactive group comprises a carboxylic acid group, an alkyl sulfate group, or salts thereof.

16. A process for preparing a modified pigment having attached at least one comprising group comprising the step of reacting a dried mixture comprising a pigment having attached at least one reactive group and a modifying agent under high intensify mixing conditions for a time and temperature sufficient to form the modified pigment, wherein the reactive group comprises an amine group or salt thereof.

17. The process of claim 16, wherein the amine group is a benzylamine, phenethylamine, phenyleneamine, or aminoalkylamine.

18. The process of claim 7, wherein the reactive group is a polymeric group.

19. The process of claim 18, wherein the polymeric group is a polyamine group, a polyalkylene oxide group, a polyol group, a polyacid group, or a salt thereof.

20. The process of claim 19, wherein the polyacid group is an polyacrylic acid group, a polymethacrylic acid group, a poly(styrene-acrylic acid) group, a poly(styrene-methacrylic acid) group, or styrene-maleic acid group.

21. The process of claim 19, wherein the polyamine group is a polyethyleneimine group, a pentaethylenehexamine group, or a polyamidoamine group.

22. The process of claim 7, where in the modifying agent comprises at least one carboxylic acid or ester, acid chloride, sulfonyl chloride, acyl azide, isocyanate, ketone, aldehyde, anhydride, amide, imide, α,β-unsaturated ketone, aldehyde, or sulfone, alkyl halide, epoxide, alkyl sulfonate or sulfate, amine, hydrazine, alcohol, thiol, hydrazide, oxime, triazene, carbanion, aromatic compound, or salts thereof.

23. A process for preparing a modified pigment having attached at least one organic group comprising the step of reacting a dried mixture comprising a pigment having attached at least one reactive group and a modifying agent under high intensity mixing conditions for a time and temperature sufficient to form the modified pigment, wherein the modifying agent comprises a carboxylic acid, an amine, or a salt thereof.

24. The process of claim 7, wherein the modifying agent is a polymer.

25. The process of claim 24, wherein the polymer is a polyamine, a polyalkylene oxide, a polyol, a polyacid, or a salt thereof.

26. The process of claim 24, wherein the polymer is a polyamine.

27. The process of claim 24, wherein the polymer is a polyacid.

28. The process of claim 24, wherein the polymer is a copolymer of acrylic acid or methacrylic acid.

29. The process of claim 7, wherein the modified pigment is prepared in a high intensity mixer selected from the group consisting of: single or double planetary mixers, dual shaft planetary mixers, helical mixers, double arm kneading mixers, high intensity mixers, two roll mixers, three roll mixers, single screw extruders, and twin screw extruders.

30. The process of claim 7, wherein the dine sufficient to form the modified pigment is between about 0.1 minutes and about 300 minutes.

31. The process of claim 7, wherein the temperature sufficient to form the modified pigment is between about 25° C. and about 250° C.

32. The process of claim 16, wherein the amine group is a polyethyleneimine group, a pentaethylenehexamine group, or a polyamidoamine group.

* * * * *